United States Patent [19]

McDearmon

[11] Patent Number: 4,904,863
[45] Date of Patent: Feb. 27, 1990

[54] POLARIMETRIC OPTICAL FIBER PRESSURE SENSOR

[75] Inventor: Graham F. McDearmon, Munroe Falls, Ohio

[73] Assignee: Loral Corporation, New York, N.Y.

[21] Appl. No.: 275,990

[22] Filed: Nov. 25, 1958

[51] Int. Cl.⁴ .......................... H01J 5/16; H01J 40/14
[52] U.S. Cl. ................................. 250/227; 250/231 P;
350/96.29; 350/96.33; 356/345; 356/351
[58] Field of Search ............... 250/231 P, 231 R, 225,
250/227, 239; 356/351, 357, 358, 365, 345;
73/705; 350/96.29, 96.33, 96.2, 96.21

[56] References Cited

U.S. PATENT DOCUMENTS

| | | | |
|---|---|---|---|
| 4,095,101 | 6/1978 | Lemelson | 250/227 |
| 4,468,090 | 8/1984 | Ulrich et al. | 356/351 |
| 4,534,222 | 8/1985 | Finch et al. | 356/345 |
| 4,577,100 | 3/1986 | Meltz et al. | 250/231 P |
| 4,613,752 | 9/1986 | Davis | 356/345 |
| 4,678,909 | 7/1987 | Jackson et al. | 250/231 P |
| 4,688,200 | 8/1987 | Poorman et al. | 356/345 |
| 4,724,316 | 2/1988 | Morton | 250/227 |
| 4,733,933 | 3/1988 | Pikulski | 250/227 |
| 4,767,210 | 8/1988 | Kashyap | 356/345 |
| 4,799,752 | 1/1989 | Carome | 250/231 P |

Primary Examiner—David C. Nelms
Assistant Examiner—Michael Messinger
Attorney, Agent, or Firm—L. A. Germain

[57] ABSTRACT

An optical fiber pressure sensor in a double polarimetric configuration comprises a first polarimetric circuit including an optical fiber sensing coil in a planar, substantially circuitous orientation between two flat plates to provide an optical signal indicative of a pressure within a fluid medium, the circuit including light detection and signal demodulation means to provide an output signal indicative of the pressure; and a second polarimetric circuit intercoupled to the first circuit through an optical coupler, the second circuit providing a source of light which is divided by the coupler between the two circuits and the second circuit includes optical and electronic circuit means to provide a feedback signal to stabilize the operation of the source of light. The pressure sensor is configured and packaged to enhance its sensitivity to pressure while substantially immunizing it against changes in temperature.

26 Claims, 3 Drawing Sheets

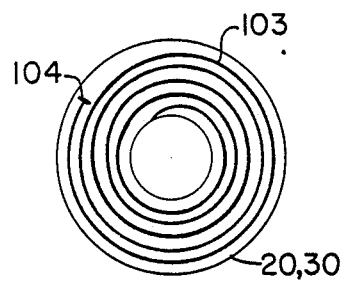 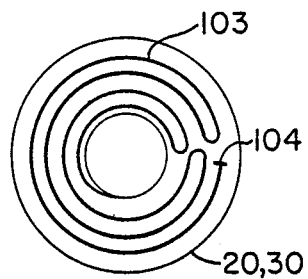 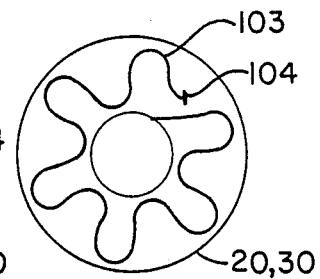
FIG.-2A  FIG.-2B  FIG.-2C
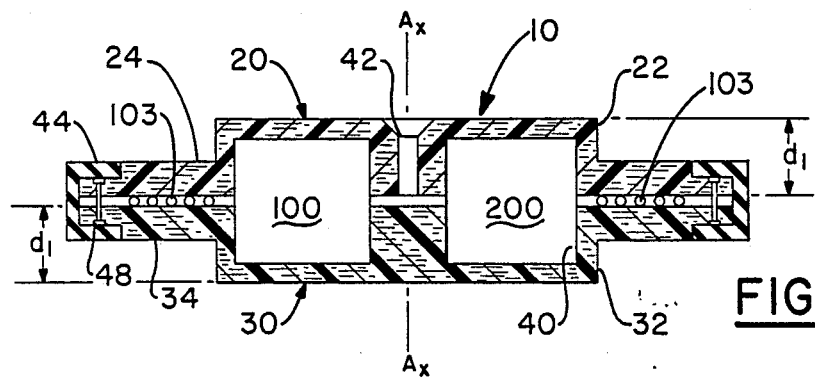
FIG.-3
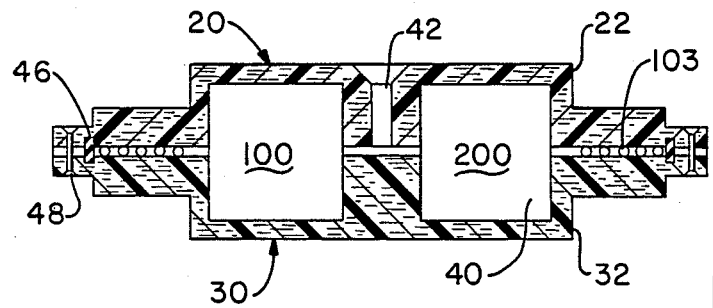
FIG.-4
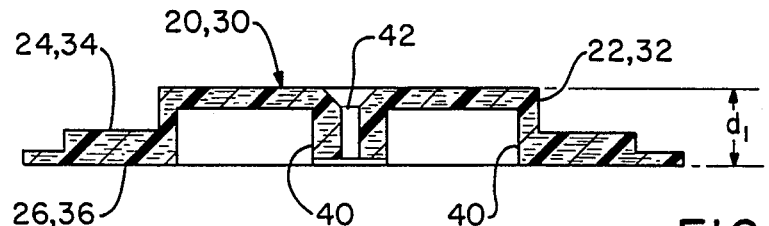
FIG.-5

POLARIMETRIC OPTICAL FIBER PRESSURE SENSOR

BACKGROUND OF THE INVENTION

This invention generally relates to optical fiber sensors and more particularly to a configuration and construction of an optical fiber pressure sensor. The invention provides a sensor which may be applied to detecting pressure in a fluid medium such as saltwater.

Marked advancements have been made in optical fiber technology over the past dozen years. Improvements in optical fibers per se have led to a proliferation of sensors which are applied to the detection of many types of physical changes. For example, various configurations of sensors using optical fibers have been applied to detecting changes in temperature, pressure, sound, relative rotation, current, voltage, magnetics and other physical phenomena.

Generally, optical fibers exhibit a natural immunity to environmental influences including electromagnetic influences and this makes them valuable in the communications field wherein information is transmitted over long distances. However, such natural immunity poses a problem in the application of optical fibers to sensing changes in the physical environment and therefore special attention is given to manufacturing specific optical fiber constructions which may be packaged to respond sensitively to the environment.

Trends in optical fiber sensor technology are disclosed in the IEEE JOURNAL OF QUANTUM ELECTRONICS, Vol. QE-4 of April 1982 and in HIGH TECHNOLOGY, Vol. 2, No. 4 of July-August 1982 in an article by Jeff Hecht entitled "Fiber-Optics Turns to Sensing." In the latter reference, an acoustic sensor is described and illustrated in the configuration of a Mach-Zehnder interferometer. This type sensor is well documented in the literature and utilizes a single-mode optical fiber to detect the relative phase shift of light propogating in two arms which comprise the interferometer.

A particular configuration of a Mach-Zehnder pressure-sensing interferometer is taught in U.S. Pat. No. 4,162,397 to Bucaro et al, issued July 24, 1979. According to this patent, an optical fiber coil forms a sensing path of the interferometer and it is placed in a fluid medium while a second optical fiber which forms a reference path is isolated from any pressure change which may be present in the fluid. Thus, a pressure incident on the fiber coil changes the index of refraction of the coiled fiber to modulate the phase of light propogating within the coil. The light which propogates through the reference arm remains unmodulated and the two light rays are combined at the interferometer output to form an interference pattern which is directly related to the presence of a pressure change in the fluid.

An alternative to the Mach-Zehnder configuration fiber-optic interferometer is a polarimetric sensor which utilizes a single-mode optical fiber for the sensing function. The single-mode optical fiber supports two polarization eigenmodes exhibiting different phase delays and an interference pattern results from a mixing of the two polarization eigenmodes. Optical phase delay fluctuations within the fiber are converted to intensity fluctuations by optically mixing the two polarization modes at the fiber output. The theory of polarimeters is outlined by Marc D. Mermelstein, "High-Birefringence Fiber-Optic Polarimeters with Submicroradian Phase Delay Detectability", JOURNAL OF LIGHTWAVE TECHNOLOGY, Vol. LT-4, No. 4 (April 1986).

Fiber-optic sensors are very sensitive to temperature changes and therefore are excellent temperature sensors. A particular challenge is to develop a fiber-optic pressure sensor that is sensitive to pressure but which also exhibits a marked reduction in temperature sensitivity. A polarimetric sensor stabilized against ambient temperature changes is described in "Polarimetric Strain and Pressure Sensors Using Temperature-Independent Polarization Maintaining Optical Fiber" by Y. Kikuchi et al, 2nd International Conference on Optical Fiber Sensors, September 1984. According to this reference, temperature dependence of intrinsic fiber birefringence may be cancelled by the thermal stress of multi-layer plastic coatings.

The present invention is directed to a uniquely configured polarimetric sensor for detecting pressure and to a particular packaging and arrangement of the various elements which comprise the sensor. Because the invention is designed for application in a temperature-changing environment, special attention has been given to packaging such that the sensor sensitivity to temperature is minimized while the sensitivity to pressure is enhanced.

SUMMARY OF THE INVENTION

A sensor for detecting pressure and pressure changes in a fluid medium comprises a fiber-optic polarimetric sensing circuit and a fiber-optic polarimetric feedback stabilization circuit, both circuits being interconnected through an optical coupling means, said feedback circuit comprising a source of radiant energy optically connected to the coupling means through a length of optical fiber and a convertor means optically connected to the coupling means and to feedback control circuitry to provide an electrical signal indicative of a change in a particular predetermined characteristic of the light from the source of radiant energy to provide a controlling current to the source and maintain it within a predetermined operating range; said polarimetric sensing circuit comprising a linearly birefringent, single-mode optical fiber arranged in a planar, substantially circuitously-looped sensing configuration having one end optically coupled into the coupling means and the opposite end a mirrored terminal end to reflect light back through the fiber, and a convertor means optically coupled into the coupling means to receive light propagating therethrough from the optical sensing fiber to detect any change in the light which may have been effected; said sensor including a housing comprised of two juxtaposed plates exhibiting a small thermal expansion coefficient and which plates sandwich the planar circuitously-looped optical fiber between them in a sealed arrangement such that pressure incident on at least one of the plates produces a change in the light propogating through the optical fiber, and the convertor means of the sensing circuit provides a signal output indicative of the pressure.

BRIEF DESCRIPTION OF THE DRAWINGS

The features and advantages of the present invention will be better understood and appreciated from a consideration of the following detailed description of the preferred embodiment when taken in conjunction with the accompanying drawings wherein like-reference numerals are used throughout the several figures to indicate like elements and in which:

FIGS. 2A, 2B and 2C are plan views of various configurations of the sensor as it may be mounted within a housing;

FIG. 3 is a cross-sectional elevational view illustrating one embodiment of the housing configuration;

FIG. 4 is a cross-sectional elevational view illustrating another embodiment of the housing configuration;

FIG. 5 is a cross-sectional elevational view of a plate member forming one-half of the housing;

DETAILED DESCRIPTION OF THE INVENTION

Figure 1:
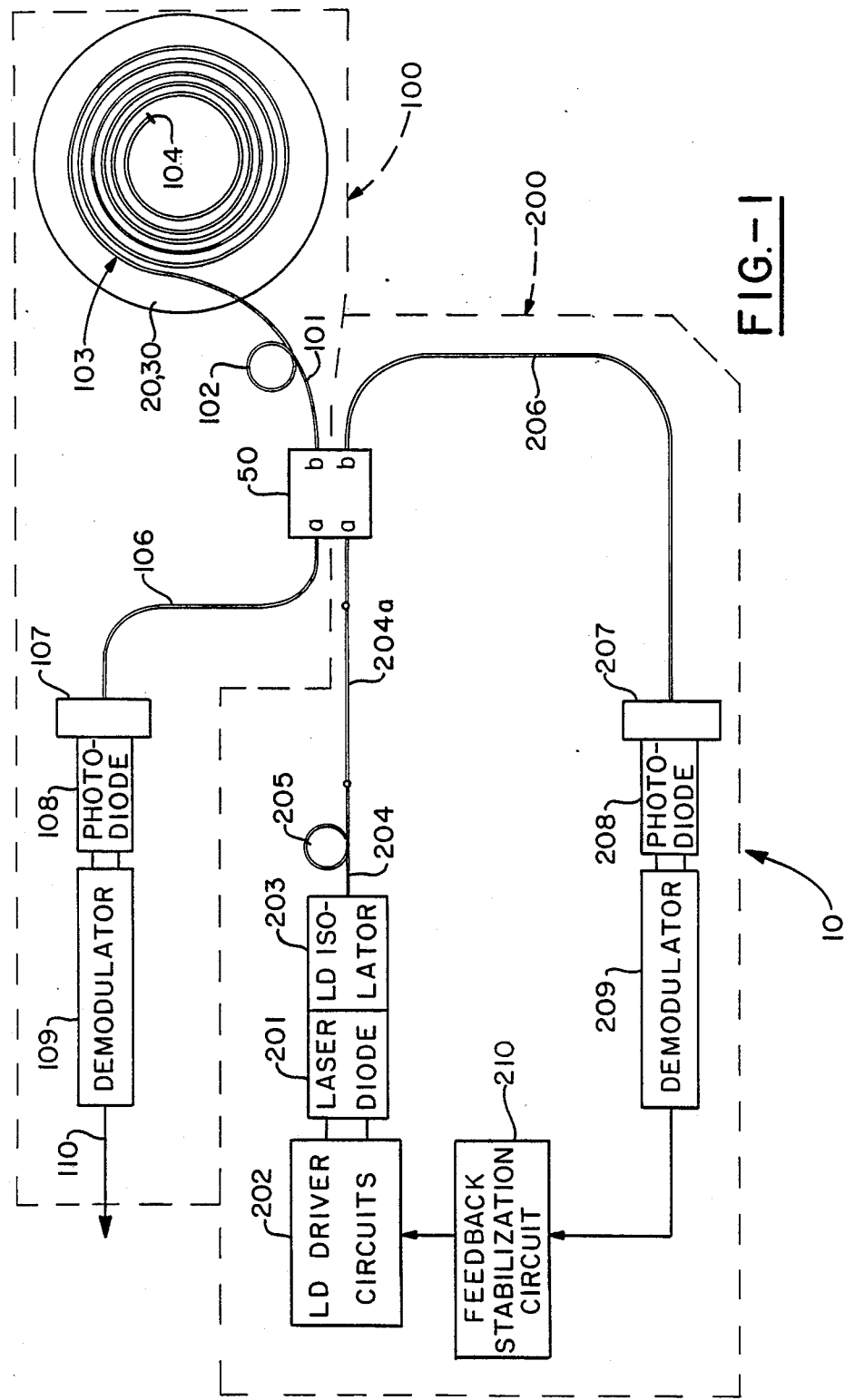
FIG. 1 schematically illustrates the elements forming a double polarimetric configuration for an optical fiber pressure sensor comprising this invention.

Referring to the drawings, a fiber-optic polarimetric pressure sensor is schematically illustrated in FIG. 1 and generally indicated by reference numeral 10. The sensor 10 comprises a double polarimetric branch configuration wherein a first branch circuit, generally indicated by reference numeral 100, is configured to sense pressure while a second branch circuit, generally indicated by reference numeral 200, provides feedback stabilization of a source of radiant energy. The optical branch circuits 100, 200 are both indicated by dashed lines and these both may or may not be mounted within a housing to be described in more detail hereinafter.

Referring firstly to the branch circuit 200, a source of radiant energy is provided by a laser diode 201 which is driven by circuitry 202 in a conventional manner to provide a desired coherent light output. The light is coupled into an optical fiber 204 at the output of the laser diode 201 and an isolator means 203 is provided to isolate the laser from any back-reflected and/or scattered light which may be present to render the laser operation "noisy." The coherent light propogating through the optical fiber 204 is rotated in a polarization rotator 205 such that the two polarization states of a section of single-mode polarization preserving optical fiber 204a are equally excited. The section of polarization preserving optical fiber 204a provides the optical path difference required to implement any modulated laser demodulation scheme and these may include FM, phase generated carrier, and wavelength switching demodulation.

The light propagating through the polarization preserving optical fiber 204a is split equally in a fiber-optic coupler 50 characterized by optical terminal pairs identified by "a" and "b", which coupler passes one-half of the light from an "a" terminal to the pressure sensing branch 100 via a "b" terminal and optical fiber 101 and passes the remaining one-half of the light to the second branch 200 via the second "b" terminal and optical fiber 206. The light propogating in optical fiber 206 is isolated from any pressure which may be present by reason of its location and/or its mounting arrangement. In any case, the light is fed into an optical convertor means comprising a polarization analyzer 207 which comprises a polaroid film and then to a photodiode 208 which produces a signal for demodulation in demodulator circuitry 209. The demodulator 209 provides an output signal which is fed back to the laser diode driver circuits 202 through stabilization circuit means 210. This configuration minimizes any drifts in the laser operating wavelength bias point by controlling its current. A reset circuit within the circuit means 210 is also provided to keep the laser diode 201 operating within its safe operating range since anticipated temperature changes in the laser diode may cause large feedback signals.

The remaining one-half of the light passing out of the fiber-optic coupler 50 to the sensing branch circuit 100 propagates through optical fiber 101 and it has its principal linear polarizations aligned by a polarization rotator 102. The principal linear polarizations are aligned parallel and perpendicular to the plane of the fiber mounting arrangement which will be more specifically described hereinafter. The light output from the optical fiber rotator 102 is coupled to the sensor fiber which is circuitously routed and/or spiralled in a manner indicated generally at 103. The sensor fiber configuration is in a single plane orientation and adjacently-positioned lengths of optical fiber are in a non-contacting position with respect to each other, i.e., there is an air space between adjacently-positioned optical fibers. The terminal end indicated at reference numeral 104 is mirror-coated to induce a double pass of the light through the sensing optical fiber 103 and this, of course, results in twice the sensitivity. The returning light passes through the coupler 50 which again splits the output, one-half propogating into the branch circuit 200 where it is lost while the remaining one-half propogates into optical fiber 106 where it is fed to a second polarization analyzer 107 and then to a photodiode 108. The polarization analyzer 107 comprises a polaroid film which is aligned at 45 degrees with respect to the principal linear polarization states of the fiber and this maximizes the visibility of the interference pattern between the states in a well-known manner. The photodiode 108 provides an output signal to a demodulator 109 producing a voltage signal output 110 which is proportional to any pressure incident on the optical fiber sensor portion 103. Of course it will be recognized that the demodulation scheme may be adapted to the detection of an ambient pressure or it may be adapted to the detection of a change in pressure and this adaptation is considered within the skill of those working in the art.

The above-described pressure sensor configuration may experience major sources of spurious signals which are produced by changes in temperature. These signals may be attributed to the attached structures, the optical fibers per se, the source of radiant energy, the manner of coupling of the elements, and the electronics. These signals have been minimized in the present invention by the following techniques.

Firstly, the circuitously-positioned optical sensing fiber 103 is mounted in a sandwiched configuration between a pair of flat plates 20 and 30 as illustrated in either of FIGS. 3 or 4. This arrangement increases the pressure sensitivity in proportion to the effective area of the plates, but it also increases the sensitivity to temperature. To minimize the sensitivity to temperature, the plates 20,30 may be comprised of a material exhibiting a small isotropic or quasi-isotropic thermal expansion coefficient in the plane of the plates. For example, the plates may be comprised of graphite fibers in a resin matrix, the fibers being either specifically oriented or randomly oriented in a tape. A plurality of such tapes are laid up to the desired thickness such that graphite fibers of one tape are at angles with respect to fibers of contiguously laid tapes. This is to provide fiber orientations in the plane of the plate at all angles with respect to a central orthogonal axis indicated in the drawings by line $A_x$—$A_x$. The anisotropic composite construction of the plates 20,30 provides good thermal insulation above 0.01 Hz while also providing sufficient thermal conductivity below 0.01 Hz to heat sink the laser diode to the external environment for its proper operation when the feedback stablization circuit 200 is mounted within the volume confines of the plates 20,30 as will be more specifically described hereinafter.

Referring to FIGS. 2-5 of the drawings, it can be seen that the plates 20,30 are in a configuration of a pair of juxtaposed circular plate members which actually define the housing for the sensor 10. Each plate member 20,30 defines a central core portion 22,32 which has a sufficient depth "$d_1$" such that, when the two plates are in mating relationship as illustrated, an annular core space 40 may be provided. The core space 40 may house the optics and electronics which comprise the sensor 10. The circular configuration of the core space 40 facilitates orientating of the optical fibers in smooth transitional curves within the housing. The optical sensing fiber 103 is laid in a circuitous orientation about the area outside of the core space and positioned in a planar manner such that the outer rim areas of the plates indicated at reference numerals 24,34 sandwich the optical fiber 103 between them. The optical fiber 103 may be in a helical coil arrangement as illustrated in FIG. 2A or it may be laid out in any other circuitous and/or serpentine arrangement as illustrated in FIGS. 2B and 2C. In any case, the optical fiber 103 is laid out in a smooth-curved formation, adjacently oriented portions of the fiber being in non-contacting relationship, i.e., separated by an air space. As hereinbefore stated, the optical fiber principal linear polarizations are aligned parallel and perpendicular to the plane of plates 20,30.

Entry into and exit out of the housing is provided by a central access hole 42 which may be in either one or the other of the plates 20,30. This, of course, is to provide electrical power into the housing for the various electronic circuits which comprise the sensor and to receive the output detection signal indicative of the sensor activity from the sensor branch 100. The access hole 42 will, of course, be finally sealed with an appropriate material to insure the leakproof integrity of the sensor.

Finally, the housing is sealed from the external environment and this may be accomplished in various ways. FIG. 3 illustrates an embodiment wherein a peripheral rubber boot 44 is used while FIG. 4 illustrates an embodiment wherein an O-ring seal 46 is used. The two housing plates 20,30 are maintained in their juxtaposed relationship by a plurality of fasteners 48 which are in equal spaced-apart radial positions about the outer surface edge of the housing. These maintain the housing plates 20,30 in a clamped orientation and the clamping pressure is predetermined such that no unwanted pressure force is imposed on the sensing optical fiber 103 which is sandwiched between them.

Figure 6:
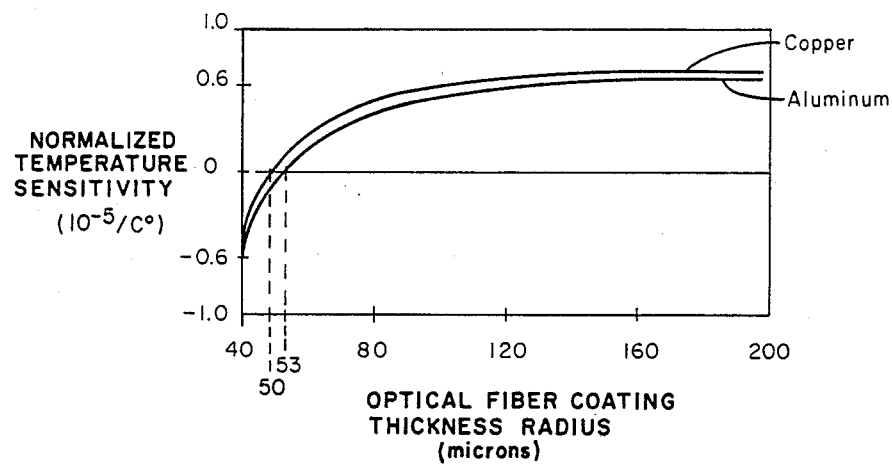
FIG. 6 is a plot of the normalized temperature sensitivity as a function of an outer coating radius for a particular optical fiber sandwiched between two plates.
Figure 7:
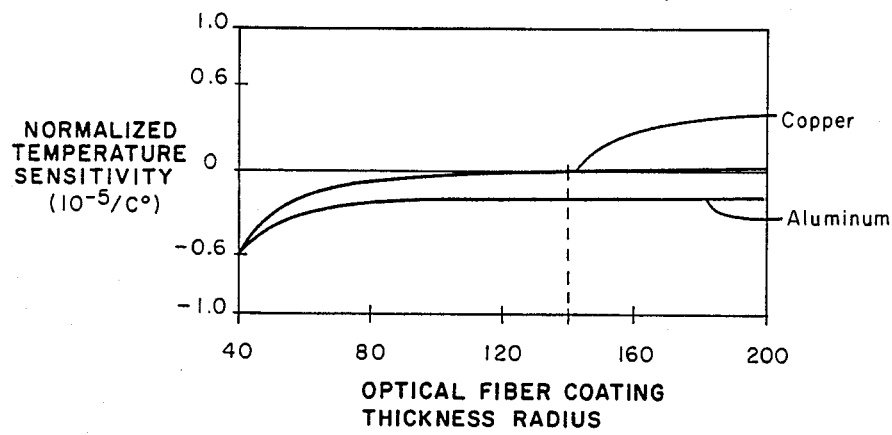
FIG. 7 is a plot of the normalized temperature sensitivity as a function of an outer coating radius for a particular optical fiber that is free of any structures.

Continuing now with the temperature sensitivity minimizing techniques, it is known that the temperature sensitivity of an optical fiber in a polarimetric configuration is proportional to its birefringence. The birefringence of the pressure-sensing optical fiber 103 is proportional to the ambient pressure and therefore its temperature sensitivity depends on the ambient pressure. This, of course, makes cancellation of the temperature effects by measurement techniques very difficult and complex. It is known, however, that the temperature sensitivity of an optical fiber may be decreased, independent of the ambient pressure, by coating the optical fiber with a suitable material to a specific thickness. FIGS. 6 and 7 illustrate the results of an analysis wherein the normalized temperature sensitivity (change in optical phase difference per degree Celsius divided by the product of the propogation constant, core index of refraction difference, and the fiber length) is plotted as a function of the outer coating radius. The analysis is for single-mode fused silica optical fiber having an outer radius of about 40 microns. FIG. 6 shows that a theoretical zero temperature sensitivity may be achieved by sandwiching the optical fiber between two plates which exhibit a small inplane thermal expansion coefficient, the optical fiber being coated with copper to an outer radius of 50 microns or coated with aluminum to an outer radius of about 53 microns. FIG. 7 illustrates the theoretical zero temperature sensitivity for a coated optical fiber which is not sandwiched between two plates. An optical fiber that is copper coated reaches zero thermal sensitivity at an outer radius of about 140 microns, but an aluminum-coated optical fiber cannot achieve a zero crossover at any coating thickness. Actually, zero temperature sensitivity cannot be achieved in the real world, but as illustrated, the sensitivity can be minimized by a proper selection of optical fiber, metal coating thickness, and mounting arrangement. In the fiber-optic double polarimetric configuration shown in FIG. 1 of the drawings, optical fibers 101, 105, 204, 204a, and 206 are copper-coated optical fiber as dictated by FIG. 7 while the sensing optical fiber 103 comprises either copper or aluminum coatings as dictated by FIG. 6. The coating thickness on the sensing fiber 103 is preferably within the range of 10-20 microns for an 80 micron diameter glass optical fiber. While the discussion and the showings of FIGS. 6 and 7 have been directed to optical fibers coated with either aluminum or copper, it will be recognized by those skilled in the art that other metal coatings may also be used. For example, coatings of silver, tin, or zinc exhibit similar characteristics in this type application and therefore the invention is not considered limited in any way by the specific coating used. Thus, the pressure sensing optical fiber 103 may be a fused silica single-mode optical fiber coated with metal taken from the group comprising aluminum, copper, silver, tin, and zinc. Furthermore, it will be recognized that the coating thickness will vary dependent upon the outer radius of the optical fiber. As hereinbefore mentioned, the FIGS. 6 and 7 analysis is for fused silica optical fiber having an outer radius of 40 microns. The metal coating thickness for this application will therefore reach a limit, again dependent upon the fiber outer radius, of about one millimeter.

Tests conducted in accordance with the above description show that the force sensitivity of an aluminum-coated optical fiber 103 comprised of 40.5 micron outside radius glass with 11.5 microns of aluminum coating is 0.71 radians/N. Finite element analysis predicts a pressure force sensitivity of 0.70 radians/N. The sealed housing comprised of the plates 20,30 survived a pressure load of 3.7 MPa without damage. The sensor reasonably may obtain a pressure resolution of 5 Pa within a range of 0.003 Hz to 0.3 Hz during an external temperature change of 5 degrees F. in 20 minutes. The sensor may exhibit a dynamic range =2 MPa(DC), =+50 kPa (AC) and a burst pressure of 3.7 MPa.

Thirdly with respect to temperature sensitivity minimization, the operation (intensity and wavelength) of a laser diode is sensitive to temperature changes. Various means known in the electronics art to stabilize the operation consume more power than what is desired for the present application. Accordingly, the present design uses the output of the second low power polarimeter 200 to compensate for laser diode drifts. The branch circuit 200 which is isolated from any external pressure consumes only 10's mW for operation of the demodulator and feedback circuits to compensate for any drifts in the laser diode operating range. When all of the optical fibers of the system are coated as described above to reduce their temperature sensitivity to within a particular specification, any remaining signal will be due to changes in the laser diode and/or the electronics. Therefore, the feedback polarimetric circuit 200 helps to stabilize the operation of the laser diode and electronics. The sensor 10 preferably uses a laser source of radiant energy to produce coherent light and this is because laser demodulation is amenable to temperature sensitivity minimization. However, it will be recognized that incoherent light as may be produced by an LED source of radiant energy may also be applied to the sensor operation. In this respect, the demodulation technique will be of a type amenable to incoherent light and various such schemes are already known and understood by persons working in this art. Therefore, the invention is not considered limited by the source of radiant energy applied or by the demodulation scheme used. Additionally, other standard techniques for minimizing the temperature sensitivity of electronic circuit operation may also be used. Furthermore, the fiber optic coupling exhibits a small temperature dependence and since the FM technique is relatively insensitive to intensity changes, its implementation minimizes the effects, if any, of temperature changes in the coupling.

It will be recognized by persons skilled in this art that the present invention may be used in various ways. For example, the sensor may be applied to the detection and establishment of a particular pressure. When subjected to pressure due to a specific depth of fluid, the sensor may provide an output signal indicative of the pressure at that depth. Alternatively the sensor may be established at the pressure which exists at a particular depth and be applied to sensing the existence of a change in pressure above or below the existing pressure. Further, the sensor may have its housing interior pressurized from an external source of a known pressure and thereafter used to determine a differential pressure as may exist between it and the external environment. These and other alternative modes of operation are considered within the capabilities of the present invention.

While certain representative embodiments and details have been shown for the purpose of illustrating the invention, it will be apparent to those skilled in this art that various changes and modifications may be made therein without departing from the spirit or scope of the invention.

What is claimed is:

1. A sensor for detecting a pressure in a fluid medium comprises in combination:
   A. an optical coupling means having a pair of 'a' terminals and a pair of 'b' terminals wherein light passing into either one of the 'a' terminals is split between the pair of 'b' terminals and light passing into either of the 'b' terminals is split between the pair of 'a' terminals;
   B. a first optical polarimetric circuit comprising:
      (i) a source of light;
      (ii) an optical fiber optically connecting the source of light into an 'a' terminal of the coupling means;
      (iii) means optically connected to a 'b' terminal of the coupling means to convert light to an electrical signal indicative of a change in a particular characteristic of the light from a predetermined value;
      (iv) feedback control means interconnecting the convertor means and the source of light to adjust a controlling current and maintain the source within a predetermined operating range;
   C. a second optical polarimetric circuit comprising:
      (i) a single-mode, pressure-sensing optical fiber arranged in a planar, substantially circuitously-looped configuration and having one end optically connected to the other 'b' terminal of the coupling means and having a mirrored terminal end to reflect light back through the optical fiber;
      (ii) means optically connected to the other 'a' terminal of the coupling means to receive light from the optical sensing fiber and to detect any change in the light as may be effected by a pressure and provide an output electrical signal indicative of the change; and
   D. a sealed housing comprised of two juxtaposed plates of a material exhibiting a small thermal expansion coefficient, said plates sandwiching the planar, circuitously-looped optical fiber between them such that any pressure incident on at least one of the plates produces a change in the light propogating through the fiber.

2. A sensor as set forth in claim 1 wherein the pressure-sensing optical fiber comprises single-mode optical fiber coated with metal taken from a group comprising aluminum, copper, silver, tin, and zinc.

3. A sensor as set forth in claim 1 wherein the pressure-sensing optical fiber comprises single-mode fused silica optical fiber having a radius of 40 microns and coated with aluminum to an outer radius of not more than 20 microns.

4. A sensor as set forth in claim 1 wherein the pressure sensing optical fiber is arranged in a planar helically-coiled arrangement.

5. A sensor as set forth in claim 1 wherein the pressure sensing optical fiber is arranged in a planar serpentine-like arrangement.

6. A sensor as set forth in claim 1 wherein the source of light comprises a laser diode providing coherent light output.

7. The sensor as set forth in claim 1 wherein the housing plates comprise graphite fibers in a resin matrix forming a composite exhibiting a small quasiisotropic thermal expansion coefficient.

8. A sensor as set forth in claim 1 wherein all of the elements comprising the sensor are mounted within the housing as defined by the plates.

9. A sensor as set forth in claim 7 wherein the plates are sealed about their peripheral edges by a rubber boot.

10. A sensor as set forth in claim 7 wherein the housing plates are sealed by an O-ring positioned within annular grooves on the interior facing surfaces of the plates.

11. A sensor as set forth in claim 9 wherein the electronic circuitry and optical elements of the sensor are mounted in the housing within a central core space defined by the two plates and within the central area as defined by the helically-coiled sensing optical fiber.

12. A sensor as set forth in claim 10 wherein the electronic circuitry and optical elements of the sensor are mounted in the housing within a central core space defined by the two plates and within the central area as defined by the serpentine-like sensing optical fiber.

13. A sensor as set forth in claim 2 wherein the coating thickness is not more than one millimeter.

14. A sensor as set forth in claim 3 wherein the coating thickness is not more than one millimeter.

15. A sensor as set forth in claim 1 wherein the optical fiber connecting the source of light into the coupling means comprises a portion of polarization-preserving optical fiber that is coated with copper.

16. A sensor as set forth in claim 1 wherein the source of light comprises an LED providing incoherent light output.

17. A sensor as set forth in claim 1 adapted for detecting an ambient pressure within a fluid medium.

18. A sensor as set forth in claim 1 adapted for detecting a change in pressure within a fluid medium.

19. A sensor as set forth in claim 1 wherein the housing plates comprise a material exhibiting a small isotropic thermal expansion coefficient.

20. A sensor for detecting pressure and pressure changes in a fluid medium comprises a fiber-optic polarimetric-sensing circuit and a fiber-optic polarimetric feedback stabilization circuit, both circuits being interconnected through an optical coupling means, said feedback circuit comprising a source of radiant energy optically connected to the coupling means through a length of polarization-preserving optical fiber and a convertor means optically connected to the coupling means and to feedback control circuitry to provide an electrical signal indicative of a change in a particular characteristic of the light from the source of radiant energy to provide a controlling current to the source and maintain it within a predetermined operating range; said polarimetric-sensing circuit comprising a linearly birefringent, single-mode, metal-coated optical fiber arranged in a planar, substantially circuitously-looped configuration having one end optically coupled into the coupling means and the opposite end a mirrored terminal end to reflect light back through the fiber, and a convertor means optically coupled into the coupling means to receive light propogating therethrough from the optical-sensing fiber to detect any change in the light which may have been effected; said sensor including a housing comprised of two juxtaposed plates exhibiting a small thermal expansion coefficient, which plates sandwich the planar circuitously-looped optical fiber between them in a sealed arrangement such that the pressure incident on at least one of the plates produces a change in the light propogating through the optical fiber, and the convertor means of the sensing circuit provides a signal output indicative of the pressure.

21. The sensor as set forth in claim 20 wherein the planar, circuitously-looped optical fiber is coated with a metal taken from the group comprising aluminum, copper, silver, tin, and zinc.

22. The sensor as set forth in claim 21 wherein the circuitously-looped optical fiber is coated with aluminum.

23. The sensor as set forth in claim 22 wherein the optical fiber is positioned in a helical configuration between the two plates which form the housing.

24. The sensor as set forth in claim 20 wherein the optical fibers of the sensor are coated with copper.

25. The sensor as set forth in claim 20 wherein the plates comprise graphite fibers in a resin matrix, the fibers being oriented in the plane of the plates at angles with respect to a central orthogonal axis through the plates such that the housing exhibits a small quasi-isotropic coefficient of thermal expansion in the plane of the plates.

26. The sensor as set forth in claim 20 wherein the housing comprises a material exhibiting a small isotropic coefficient of thermal expansion.

* * * * *